Patented Jan. 6, 1948

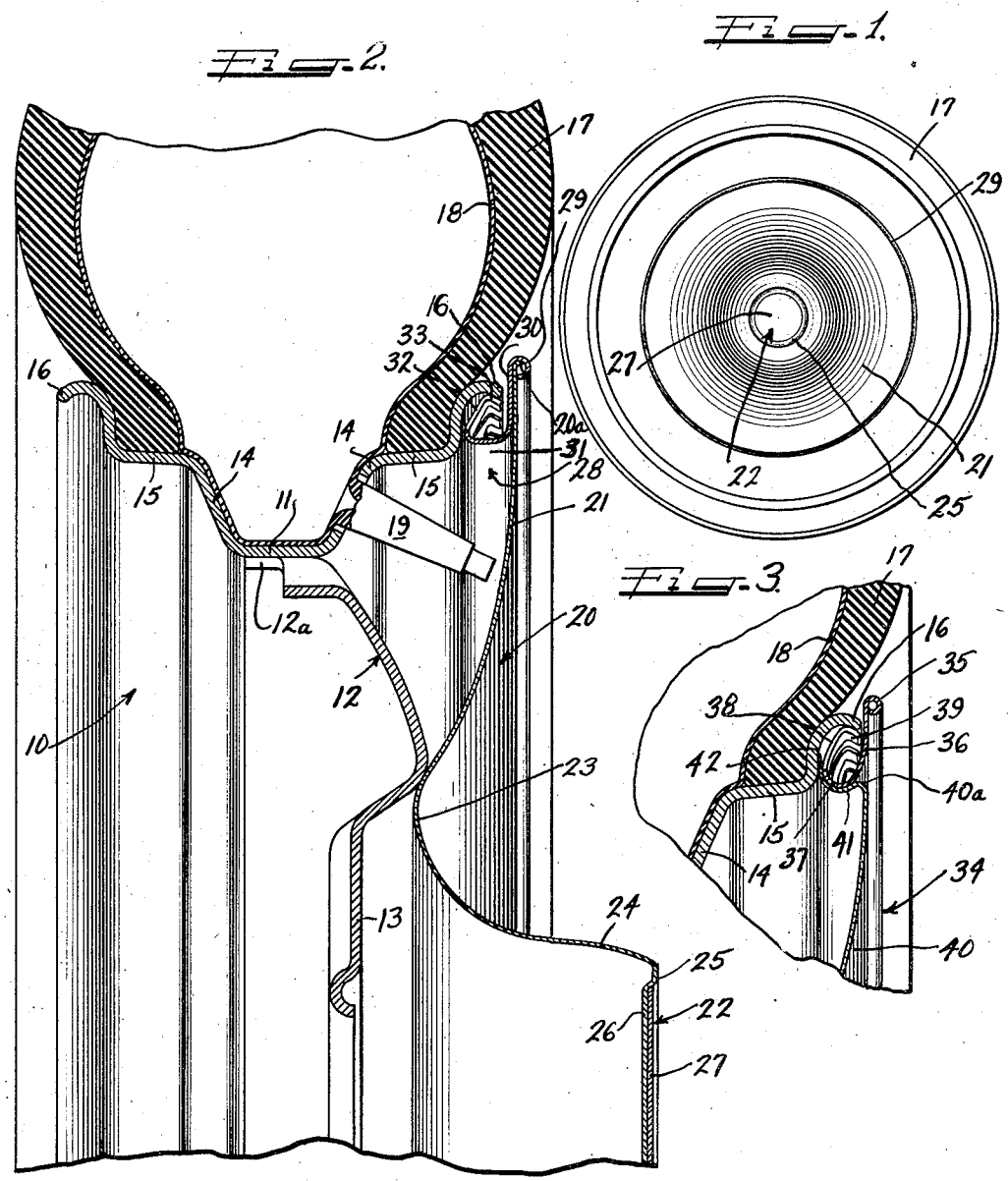

2,433,854

UNITED STATES PATENT OFFICE 2,433,854

WHEEL COVER

George Albert Lyon, Allenhurst, N. J.

Application August 20, 1943, Serial No. 499,321

5 Claims. (Cl. 301—37)

This invention relates to an improved wheel structure and is directed more particularly to an improved cover assembly therefor.

It is an important object of the invention to provide for a wheel structure an improved retaining arrangement for retaining a cover assembly over the outer side thereof.

It is another object of the invention to provide for a wheel structure an improved ornamental circular cover assembly for disposition over the outer side thereof, the cover assembly being adapted to be constructed from sheet synthetic plastic material and having characteristics enabling it to be form retaining and self-supporting and yet locally, temporarily resiliently flexible under the influence of distorting pressures imposed thereon, the cover immediately snapping back to its original and intended shape upon release of the distorting pressures.

Still another object of the invention is to provide for a wheel structure a cover of the above character having a cross-sectional, radial expanse of such magnitude that it extends radially outwardly to or beyond the edge portion of a tire rim over which it is disposed and radially inwardly over the central portion of the wheel, the cross-sectional configuration thereof being such as to substantially simulate the side wall of a tire in the tire rim over which it is disposed, thereby to give the appearance of being a continuation of the tire and to give the appearance of being a white side wall of a massive tire mounted on a wheel structure of minimum dimensions, when colored white.

It is still a further object of the invention to provide for a cover assembly, improved retaining means for retainingly engaging the same over the outer side of a wheel structure by retaining engagement at the outer peripheral part thereof.

Still a further object of the invention is to provide for a cover assembly disposed over the outer side of a wheel structure, improved retaining means for engaging the outer peripheral part thereof and retaining the same detachably upon the wheel structure with an easy-on, hard-off attachment, the retaining means also serving as a radial outward continuation of the cover member to conceal the retaining attachment thereof with the wheel structure.

In accordance with the general features of the invention, there is provided herein, in one embodiment thereof, a wheel structure having a tire rim of the drop center type provided with opposite radially inwardly, generally axially outwardly extending edge portions and having a body portion secured thereto, there being a cover member disposed over the outer side thereof, said cover member being formed from synthetic plastic sheet material and having characteristics enabling it to be self-supporting and form retaining and yet resiliently flexible under the influence of distorting forces, whereupon the cover returns to its initial condition after the distorting forces are removed therefrom, the cover member having a central part extending radially outwardly with a goose-neck configuration beyond the edge portion of the tire rim and radially inwardly to provide a central ornamental portion, the radial outer part being configurated to simulate substantially the side wall of a tire in the tire rim and the central portion being joined thereto by an annular part having axially outwardly concave goose-neck configuration of relatively great magnitude and terminating in a substantially axially outwardly extending portion which provides for the radial wall of an axially outwardly extending hub cap simulating portion that extends axially outwardly beyond the axial extremities of the wheel and tire therein, said cover being secured to the edge portion of the tire rim by means of a channelled annulus having axially outwardly bent finger elements for engaging with easy-on, hard-off engagement, the radially inner portion of the edge portion of the tire rim and having a radially outwardly channelled portion for receiving the edge of the cover.

In accordance with the general features of a further embodiment of my invention, the retaining element is provided with a radially inwardly extending portion providing a curvate surface around which the radially outer margin of the cover member may be nested for retaining engagement therewith, this retaining annulus having a portion extending radially outwardly beyond the edge portion of the tire rim to conceal the junction thereof with said rim and terminating in an ornamental, reinforcing bead.

It is still a further object of the invention to provide for a wheel structure, an ornamental disk member comprising a radially outer portion arranged to conceal the radially outer part of a wheel structure over which it is disposed and having a central hub cap simulating, integral portion extending axially outwardly beyond the axial outer extremities of the wheel structure and a tire therein to augment the appearance of being a part of the load bearing portion of the wheel structure.

Many other objects and advantages of this invention will become apparent from the following description and accompanying drawings in which:

Figure 1 is a side elevational view of a wheel structure embodying my invention;

Figure 2 is a fragmentary radial cross-sectional view of a wheel structure such as that shown in Figure 1; and Figure 3 is a fragmentary radial cross-sectional view of a wheel structure embodying a modified form of my invention.

It will be understood that the embodiments shown herein are for illustrative purposes only and may be changed or modified without departing from the spirit and scope of the invention as set forth in the appended claims.

As shown in Figure 2, the wheel structure with which my invention is associated includes a tire rim 10 of the drop center type having a base flange 11 which is secured to a central load bearing portion 12 by means of an axially inwardly extending peripheral flange 12a which may be welded or riveted to the base flange 11.

The central load bearing portion 12 is further provided with a radially inner bolt-on flange 13 which may be utilized for securing the wheel structure to a suitable appurtenance of the vehicle with which it is associated such as the brake drum or the like.

The tire rim 10 is further provided with opposite side wall flanges 14, opposite intermediate flanges 15 and opposite edge portions 16, these parts being arranged to receive the radially inner portions of a tire 17 having an inner tube 18 and a valve stem 19 which extends through an aligned aperture in the respective side wall 14.

The cover disposed herein comprises a disklike member 20 having a radially outer portion 21 and a central hub cap simulating portion 22 and, as indicated previously, is preferably formed integrally from sheet synthetic plastic material and having physical characteristics enabling it to be self-supporting and form retaining and yet resiliently, locally temporarily flexible under the influence of distorting forces so that it snaps back to its original configuration upon release of these distorting forces.

The radially outer part 21 of the cover 20 is arranged to extend radially outwardly beyond the edge portion 16 of the tire rim 10 and radially inwardly to the vicinity of the bolt-on flange 13 with a curvature generally simulating the curvature of the adjacent side wall of the tire 17, thereby to give the appearance of being a part thereof and to give the appearance of being a white side wall of the tire when colored white.

The portion 21 of the cover 20 is joined with the hub cap simulating portion 22 thereof by means of an annular section 23, a portion of which abuts the adjacent portion of the outer surface of the central load bearing part of the wheel structure to be supported thereby, this annular section 23 having a cross-sectional configuration whereby it is axially outwardly convex through a relatively large sweeping gooseneck curvature and terminates in a generally axially outward extending circular wall 24 which constitutes the radial wall of the hub cap simulating portion of the cover.

It will be seen from Figure 2 that the circular wall 24 is of such axial depth that it extends axially outwardly of the axial outward extremities of the tire rim 10 and the tire 17 therein, thereby to augment its appearance as being the hub or central load bearing portion of the wheel and at the same time being of relatively small cross-sectional size to thereby augment the appearance of a large white side wall tire on a small wheel structure. Preferably the central portion 22 of the cover assembly is provided with an axially outer closure wall 25 which is depressed centrally as at 26 and may have a medallion or other identifying indicia 27 mounted therein, this medallion, if desired, being constructed from metal or other rigidifying material to strengthen the cover structure.

To the end that the cover 20 may be detachably secured to the wheel structure there is provided herein a retaining annulus 28 having an outer turned edge 29 which extends over and around the outer edge 20a of the cover 20 so as to securely lock the cover to the annulus 28. In the application of the cover to this annulus the outer edge of the cover is initially flexed under the turned edge 29 of the annulus and then the turned edge 29 is more tightly curled against the edge of the cover so as to interlock the two parts together. I have found that it is easy to flex the outer edge of the cover into the channel afforded by the turned outer edge of the annulus 28 and that thereafter the two may be easily interlocked by tightly rolling the outer edge 29 of the annulus 28 against and relative to the edge 20a. Thus the turned edge 29 not only attaches the ring 21 to the cover but, in addition thereto, rigidifies the outer edge of the cover or wheel trim. Furthermore, by reason of the fact that the turned edge 29 extends around to the front or outer side of the cover, it adds to the ornamental appearance of the cover, particularly when the turned edge 29 is given a lustrous finish such as that which is obtainable by chromium plating and also by the use of polished stainless steel.

The annulus 28, in addition to the turned edge 29, includes a radially inwardly extending flange 30 bent rearwardly into an axially extending flange 31 which has formed thereon, axially outwardly extending spaced cover retaining fingers 32. These fingers may be of any suitable number and each includes a radially extending, free extremity 33 which projects toward the rear side of the wheel cover or trim member.

In applying the cover to the wheel, the cover is first pressed against the wheel whereby the extremities 33 of the fingers are about to enter the outermost flange 16 of the wheel rim 10, that is to say the extremities 33 bear against the outermost edge of the edge portion of the wheel rim 10 and must be cammed or deflected in order for them to enter the channel of the flange behind this edge of the rim. Upon further axial inward pressure of the cover assembly against the wheel structure the extremities 33 snap behind the portion 16 of the tire 10 and are bent to extend radially inwardly to a greater extent than when they are at rest before being applied to the wheel structure and in this flexed position they securely bear against the radially inner surface of the edge portion 16 to securely retain the cover assembly on the wheel structure. By this construction it has been found that the cover may be quickly and easily pressed home into its ultimate position as shown in Figure 2, over the wheel structure and that while securely held thereon against accidental displacement during use of the vehicle, the cover may be easily removed from the wheel structure merely by insertion of the operator's fingers behind the flange 30 and withdrawing the cover assembly from the wheel structure.

Another attribute of the foregoing construction is that the annulus 28 not only rigidifies the radially outer part of the flexible cover during use but furthermore provides this rigidity when axial outward pressures of a considerable degree are impressed upon the radially outer part of the cover to remove the same from the wheel structure as described above.

In the construction of Figure 3, the retaining annulus 34 is provided with an axially outwardly turned edge 35 and a radially inwardly extending flange 36 terminating in a curvate, generally axially inwardly extending intermediate portion 37 which in turn terminates in resilient fingers 38 having terminal members 39 for engaging the edge portion of the tire rim 10 in the manner described in connection with the construction of Figure 2. In this construction, the cover member 40 is provided at the radially outer margin thereof with a curvate, substantially axially inwardly extending flange 41 which is arranged to be disposed in nested relationship with the portion 37 of the retaining member 34, thus to provide a retained engagement between the annular retaining member 34 and the cover member 40. Preferably the flange 41 terminates in an edge portion 42 which is adapted to be disposed between the adjacent portion of the annulus 34 and the adjacent portion at the outer surface of the tire rim 10 to provide a cushion insert between the metallic annulus 34 and the metallic tire rim, thereby to prevent development of excessive vibration and the development of rattle during use of the parts.

In the assembly of the construction of Figure 3, the cover 40 may be associated with the annulus 34 prior to the mounting thereof upon the tire rim or, if desired, the annulus 34 may be applied to the rim in the manner described in conjunction with the member 28 of Figure 2, thereafter the flange 41 of the cover member 40 being resiliently flexed radially inwardly to obtain the nested relationship between said flange and the annulus 34 as shown in Figure 3.

To remove the cover structure from the wheel of Figure 3, the operator may either apply the axial outer forces to the retaining member as described in conjunction with Figure 2, or a pry-off tool may be inserted behind the radially outwardly extending bead 40a which serves as a junction between the body portion of the cover 40 and the flange 41, whereupon the flange 41 is flexed radially inwardly and may be withdrawn from the retaining member 34 whereby the latter remains upon the wheel structure and the cover is removed therefrom. It will be understood of course that preferably the cover member 40 is constructed from a synthetic plastic sheet material as in the construction of Figure 2 and thus possess physical characteristics enabling it to be form retaining and self-supporting and yet resiliently flexible.

From the foregoing it will be seen that I have provided a novel wheel cover assembly for a wheel structure in which the cover member proper is configurated in a novel manner to greatly augment the appearance of a massive tire disposed on a wheel structure of minimum dimensions, this appearance being augmented by the provision of a central portion 22 which extends substantially axially outwardly from the remaining portion of the cover assembly and is provided with radial cross-sectional dimensions such as to augment the appearance of increased size of the radially outer portion of the cover.

Furthermore, I have provided for a cover member formed from relatively flexible material, an improved retaining arrangement in which the radially outer part thereof is efficiently rigidified and strengthened at the part which is secured to the wheel structure and thus at the part at which pry-off forces are applied for removal of the cover from the wheel. Also I have provided, in one form of my invention, an improved cover assembly in which the retaining members not only serve to rigidify and ornament the radially outer portion of the cover but also is so associated with the cover that the latter may be removed from the wheel structure without disturbing the retaining member or requiring the greater forces necessary to remove the same from the wheel.

Similar reference numerals have been used upon the wheel structure and tire assembly of Figure 3 as were used on the construction of Figure 2, since these constructions are conventional and since the wheel construction embodies substantially the same parts in all modifications.

It will be seen that with the foregoing construction in which the cover member extends entirely across the wheel structure and is preferably constructed from a synthetic sheet material, that the unsprung weight of the vehicle with which it is associated is considerably reduced since the cover assembly shown herein is on the order of two-thirds less weight than a cover assembly constructed from metal or other heavy material.

What I claim is:

1. In a cover structure for a wheel including a multi-flange tire carrying rim part, a load bearing part, a circular cover for substantially covering outer exposed portions of the rim and body parts and having a turned outer margin and a cover retaining ring attached to an outer flange of the rim part including an axially inner portion nested in said flange and an axially outer portion in nested relationship with said turned outer margin of the cover, said cover being made of form-sustaining but resiliently deflectable plastic material reinforced at its outer margin by said retaining ring, the outer axially turned margin of said cover being elastically deflectable into nested relationship with said outer turned portion of the retaining ring.

2. In a cover structure for a wheel including a load bearing part and a multi-flange tire carrying part having a generally axially extending and slightly radially inwardly curled edge flange and a generally radially inwardly extending flange contiguous to the axially inner portion of said edge flange, a circular cover for substantially covering the load bearing and tire rim parts, and a cover-retaining ring member including a portion overlying the outer rim flange and extending generally axially rearwardly and then radially outwardly into engaging relation within the radially inwardly facing curve of the tire rim edge flange, said cover having its outer margin turned axially rearwardly and then radially outwardly in engagement with the retaining ring member and with the radially outwardly extending extremity of the cover margin interposed between the retaining ring member and radially inwardly extending tire rim flange, the material of said interposed marginal portion of the cover being of such characteristics as to provide a cushion insert to prevent development of vibration and rattle between the retaining ring member and the tire rim flange during use of the parts.

3. In combination in a cover structure for a wheel including a load bearing part and a multi-flange tire carrying rim part having a generally axially outwardly extending edge flange slightly curved radially inwardly at its extremity to provide a generally radially inwardly opening groove, a circular cover for substantially covering the body and rim parts of the wheel and having a generally axially inwardly extending outer edge portion, and a cover retaining ring member interengaged with said outer edge portion of the cover and having a series of under-curled spring fingers at its inner side entering into snap on and off frictional engagement within said tire rim flange groove, said retaining ring member overlying the edge of said tire rim outer flange.

4. In a cover structure for a wheel including a load bearing part and a multi-flange tire carrying rim part including an outer flange formed to provide a radially inwardly opening groove, a circular cover having an inwardly extending outer margin, and a retaining annulus interengaged with said outer margin of said cover member and comprising a generally radially extending portion arranged to overlie the tire rim edge and having its radially outer edge extending beyond the tire rim edge and reinforced to render it relatively stiff, the radially inner marginal portion of said annulus extending generally axially rearwardly and then generally radially outwardly and having spring fingers integral therewith having their free extremities projecting toward the rear side of the radially extending flange portion of the annulus and providing resilient camming shoulders adapted to snap retainingly into said tire rim flange groove, said fingers being adapted to be cammingly flexed out of said groove by manually applied axially outward force upon the reinforced radially outer edge portion of the annulus for withdrawing the cover assembly from the wheel.

5. In combination in a cover structure for a wheel including a tire rim part and a load bearing part, a circular cover member formed integrally from sheet synthetic plastic material and having physical characteristics which render it self-supporting and form-retaining but resiliently, locally temporarily flexible under the influence of distorting forces so that it snaps back to its original configuration upon release of such distorting forces, said cover member including a radially outer portion extending from adjacent to the outer edge of the tire rim part and radially inwardly in a tire side wall simulating curvature and generally axially inwardly to an interengagement with the body part of the wheel, said cover member thence curving from engagement with the body part concavely generally radially inwardly and axially outwardly into a hub cap simulating central portion, and a cover-retaining annulus concealingly related to the outer tire rim flange and having means thereon engaging said flange for attachment of the annulus thereto, said radially outer marginal portion of the cover being assembled in snap on relation with said retaining annulus and thereby retaining the cover in the body-engaging relationship thereof.

GEORGE ALBERT LYON.

REFERENCES CITED

The following references are of record in the file of this patent:

UNITED STATES PATENTS

| Number | Name | Date |
|---|---|---|
| Re. 22,042 | Lyon | Mar. 3, 1942 |
| 2,193,106 | Lyon | Mar. 12, 1940 |
| 2,202,102 | Horn | May 28, 1940 |
| Re. 19,467 | Lyon | Feb. 12, 1935 |
| 2,127,600 | Hunt | Aug. 23, 1938 |
| 1,234,387 | Pugh | July 24, 1917 |
| 1,536,743 | Anderson | May 5, 1925 |
| 1,494,179 | Mathew | May 13, 1924 |
| 2,113,541 | Blank | May 5, 1938 |
| 2,123,025 | Ramirez | July 5, 1938 |
| 2,183,220 | Horn | Dec. 12, 1939 |
| Re. 22,042 | Lyon | Mar. 3, 1942 |
| 2,239,366 | Lyon | Apr. 22, 1941 |
| 2,279,334 | Lyon | Apr. 14, 1942 |